United States Patent Office 3,544,578
Patented Dec. 1, 1970

3,544,578
METHOD FOR DEALKYLATING CERTAIN SOLONACEOUS ALKALOIDS AND DERIVATIVES THEREOF
Rolf Banholzer, Alex Heusner, Werner Schulz, Walther Sirrenberg, Gerhard Walther, and Karl Zeile, Ingelheim, Germany, assignors to Boehringer Ingelheim GmbH, Ingelheim am Rhein, Germany, a corporation of Germany
No Drawing. Filed Aug. 2, 1968, Ser. No. 749,565
Claims priority, application Germany, Aug. 4, 1967, 1,670,258
Int. Cl. C07d 43/06
U.S. Cl. 260—292         6 Claims

ABSTRACT OF THE DISCLOSURE

A process for the production of norscopolamine, noratropine, norhyoscyamine, norscopoline, nortropinone and norpseudopelletierine and their nontoxic, pharmaceutically acceptable acid addition salts and compositions and method for treating spasms in warm-blooded animals.

OBJECTS OF THE INVENTION

It is an object of the invention to provide a novel process for the preparation of bicyclic noramine compounds It is another object of the invention to provide novel spasmolytic compositions.

It is a further object of the invention to provide a novel method of treating spasms in warm-blooded animals.

These and other objects and advantages of the invention will become obvious from the following detailed description.

THE INVENTION

The novel process of the invention comprises reacting a bicyclic amine compound wherein the amine is substituted with an alkyl radical of 1 to 3 carbon atoms and in which any hydroxyl groups present have been protected in an inert anhydrous organic solvent with a compound selected from the group consisting of phosgene and diphosgene to form the corresponding N-carboxychloroamine compound and subjecting the latter to hydrolysis to form the corresponding noramine compound. The reaction scheme is illustrated in the following flow sheet using scopolamine as the modern starting material.

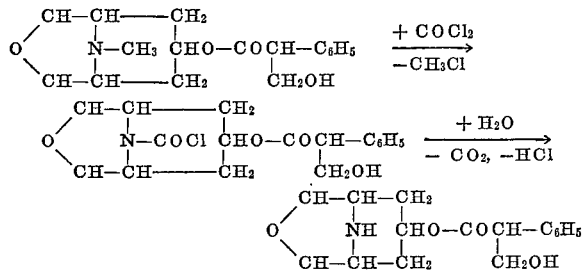

Examples of suitable starting materials for the dealkylation process of the invention are scopolamine, atropine, hyoscyamine, scopoline, tropinone, pseudopelletierine, 9-ethyl-3-granatanone, 9-propyl-3-granatanone, etc. If the starting material has a hydroxyl group such as atropine or scopoline, the hydroxyl group should be protected by a hydrolyzable group such as lower alkanoyl of 1 to 7 carbon atoms.

The reaction is effected in an inert, anhydrous organic solvent such as aromatic hydrocarbons or ethers in which the final products are insoluble or in halogenated hydrocarbons in which the final products are soluble. Examples of suitable solvents are benzene, toluene, xylene, ethyl ether, methylenechloride, chloroform, carbon tetrachloride, etc. The reaction is preferably effected at room temperature although lower temperatures may be used. When high temperatures are used, undesired side reactions may occur.

The intermediate N-carboxychloro products may be isolated since they are relatively stable compounds which are easily recrystallized. The said intermediate need not be purified for the hydrolysis step but the residue obtained by distilling off the organic solvent may be used without further treatment.

The hydrolysis step is effected in water with heat if needed. Any groups protecting hydroxyl groups may be removed during or after the hydrolysis step. The dealkylated compound may be recovered by making the aqueous solution alkaline and extracting the amine with an organic solvent. The free base may be converted into its nontoxic, pharmaceutically acceptable acid addition salt by known means.

Examples of suitable acids for the formation of the nontoxic, pharmaceutically acceptable acid addition salts are inorganic acids such as hydrochloric acid, hydrobromic acid, sulfuric acid, phosphoric acid, etc., and organic acids such as methane sulfonic acid, acetic acid, lactic acid, tartaric acid, ascorbic acid, 8-chlorotheophylline, etc.

The process of the invention has the advantage of being simple in its operation and delivers high yields of pure products which is unexpected due to the delicate nature of the starting materials. The process is particularly useful for the preparation of (—)-norscopolamine hychrochloride in a pure form (specific rotation $[\alpha]_D^{20} = -32.6°$).

The nor amine compounds produced by the process of the invention are valuable intermediates for the synthesis of pharmaceuticals and also possess valuable physiological properties, particularly a good spasmolytic activity without side effects at effective dosages. For example, (—)-norscopolamine has a spasmolytic activity almost equal to atropine with a much lower mydriatic activity than atropine. Moreover, (—)-norscopolamine lacks the central anticholinergic activity of scopolamine and has a low toxicity. The $LD_{50}$ of (—)-norscopolamine administered orally is 3850 mg./kg. in mice and 3200 mg./kg. in rats.

The novel spasmolytic compositions of the invention are comprised of an effective amount of a compound selected from the group consisting of norscopolamine, noratropine, norhyoscyamine, norscopoline, nortropinone and norpseudopelletierine and their nontoxic, pharmaceutically acceptable acid addition salts and a major amount of a pharmaceutical carrier. The usual effective single dosage is 1 to 50 mg., preferably 5 to 15 mg., of the active ingredient for the mature warm-blooded animals. The compositions may be in the form of tablets, dragees, capsules, granulates and injectable and drinkable solutions and suspensions prepared in the usual manner.

The method of the invention of treating spasms in warm-blooded animals comprises administering to warm-blooded animals an effective amount of a compound selected from the group consisting of norscopolamine, noratropine, norhyoscyamine, norscopoline, nortropinone and norpseudopelletierine and their nontoxic, pharmaceutically acceptable acid addition salts. The usual useful dose is 0.0167 to 0.833 mg./kg. depending upon the method of administration which may be oral or transcutaneous.

The spasmolytic activity was determined in the isolated rectum of the guinea pig using the method of Magnus, Pflüger's Archiv. vol. 102, page 123 (1904). The spasms were induced by acetylcholine. The mydriasis was tested in mice after subcutaneous injection according to Pulewka, Arch. exper. Path. and Pharmakol., vol. 168, page 307 (1932).

In the following examples there are described several preferred embodiments to illustrate the invention. However, it should be understood that the invention is not intended to be limited to the specific embodiments.

EXAMPLE I

Preparation of (—)-norscopolamine hydrochloride

Step A: (—)-O-acetylscopolamine hydrobromide.—219.2 gm. (0.5 mole) of (—)-scopolamine hydrobromide ·$3H_2O$ were suspended in the 768.0 gm. (7.5 moles) of acetic acid anhydride and the suspension was heated at 110 to 115° C. for 2 hours during which the said hydrated hydrobromide dissolved. After cooling the solution to room temperature, the solution was admixed with 2.5 liters of ether whereby crystallization took place. The precipitate was filtered off and washed with ether until free from acetic acid and its anhydride and dried in vacuo to obtain 210.3 gm. (98.7% yield) of crude (—)-O-acetylscopolamine hydrobromide having a melting point of 192 to 195° C. After recrystallization from a methanol-ether mixture, the product had a melting point of 196° C.

Step B: (—)-O-acetylscopolamine.—210.3 gm. (0.493 mole) of (—)-O-acetylscopolamine hydrobromide were dissolved in 750 cc. of water and 57.3 gm. (0.541 mole) of sodium carbonate were slowly added thereto. The free base separated out as an oil which was recovered and extracted six times with methylene chloride. The extracts were combined and dried over sodium sulfate to obtain 153.0 gm. (89.8% yield) of (—)-O-acetylscopolamine as a slightly yellow viscous oil.

Step C: (—) - N - carboxychloro-O-acetyl-norscopolamine.—68.7 gm. (0.199 mole) of (—)-O-acetylscopalamine were dissolved in 100 cc. of absolute toluene and while cooling the solution below 10° C., 21.7 gm. (0.219 mole) of phosgene was added. Then, the solution was stirred for 5 hours and allowed to stand for four days. The resulting precipitate was recovered and then suspended in about 200 cc. of ether. The ether was filtered off and the precipitate was washed with ether until free of phosgene and dried over calcium chloride at 60° C. at 12 mm./Hg. to obtain a crude product. The crude product was recrystallized from a benzene-ether mixture to obtain 63.7 gm. (81.3% yield) of white crystals of (—)-N-carboxychloro - O - acetyl-norscopolamine having a melting point of 98 to 99° C.

Step D: (—)-norscopolamine hydrochloride.—100.0 gm. (0.254 mole) of (—)-N-carboxychloro-O-acetylscopolamine were suspended in 128 cc. of water and the suspension was heated in a boiling water bath for 1 hour while stirring vigorously. The clear, colorless solution was mixed with 184.5 cc. of 36% hydrochloric acid while maintaining the temperature at 10–15° C. and was then stirred for two hours at room temperature to effect saponification. Then a solution of 114.8 gm. (2.87 mole) of sodium hydroxide in 455 cc. of water was added to the solution at a temperature of 10 to 15° C. to obtain a precipitate of (—)-norscopolamine. The precipitate was dissolved in methylene chloride and the solution was dried over sodium sulfate and distilled to dryness. The residue of 94.8 gm. was dissolved in 110 cc. of methanol and hydrochloric acid in ether was added thereto to form a precipitate of (—)-norscopolamine hydrochloride. After recrystallization from a mixture of methanol-ether, the product (71.0 gm.-85.8% yield) occurred as white crystals having a melting point of 221–222° C. (decomp.) and a specific rotation $[\alpha]_{20}^D = -32.6°$ ($c=2.0$ in water).

EXAMPLE II

Preparation of nortropinone hydrochloride

A solution of 27.8 gm. (0.2 mole) of tropinone in 40 cc. of anhydrous toluene and a solution of 29.1 gm. (0.294 mole) of phosgene in 100 cc. of anhydrous toluene were admixed with stirring while maintaining a temperature of 10° C. and the reaction solution was then allowed to stand for 2 days at room temperature. The reaction mixture was then filtered to remove insolubles and the filtrate was evaporated to dryness in vacuo to obtain a residue of N-carboxychloro-nortropinone, M.P. 104–05° C. The residue was dissolved in 120 cc. of water and the resulting solution was heated on a water bath until complete dissolution occurred with carbon dioxide evolution. Then the aqueous solution was evaporated in vacuo to dryness and the residue was recrystallized from acetonitrile to obtain 20.3 gm. (62.8% yield) of white crystals of nortropinone hydrochloride having a melting point of 204° C. (decomp.) and whose picrate salt melted at 177–179° C. (decomp.).

EXAMPLE III

Tablet compositions 5.0 gm. of (—)-norscopolamine hydrochloride were intimately mixed with 25.0 gm. of cornstarch, 35.4 gm. of lactose and 5.6 gm. of colloidal silicic acid and the mixture was moistened with 5% ethanol solution of polyvinylpyrrolidone. The mixture was granulated and the dried granulate was admixed with 8 gm. of cornstarch, 0.6 gm. of polyvinylpyrrolidone and 0.4 gm. of magnesium stearate. The mixture was then pressed into tablets weighing 80 mg. and containing 5.0 mg. of the active ingredient.

EXAMPLE IV

Injectable solution 15.0 gm. of (—)-norscopolamine hydrochloride, 47.0 gm. of dextrose and 1.2 gm. of tartaric acid are dissolved in sufficient twice distilled water to obtain a solution of 200 cc. The said solution is passed through a sterile filter and filled into 2 cc. ampoules under sterile conditions. The ampoules are then sterilized at 120° C. for 20 minutes.

Various modifications of the process and compositions of the invention may be made without departing from the spirit or scope thereof and it is to be understood that the invention is intended to be limited only as defined in the appended claims.

We claim:

1. A process for the preparation of a compound selected from the group consisting of norscopolamine, noratropine, norhyoscyamine, nortropinone and norpseudopelletierine comprising reacting an N-lower alkyl derivative of a compound selected from the group consisting of norscopolamine, noratropine, norhyoscyamine, nortropinone and norpseudopelletierine wherein the alkyl has 1 to 3 carbon atoms with a compound selected from the group consisting of phosgene and diphosgene to form the corresponding N-carboxychloro compound and subjecting the latter to aqueous hydrolysis to form the desired nor compound.

2. The process of claim 1, wherein any free hydroxyl group in the starting N-alkyl derivative is protected by a lower alkanoyl group of 1 to 7 carbon atoms.

3. The process of claim 1 wherein the nor compound is reacted with a nontoxic, pharmaceutically acceptable acid to form the corresponding acid addition salt.

4. The process of claim 1 wherein the hydrolysis is effected at room temperature.

5. The process of claim 1 wherein the starting material is scopolamine.

6. The process of claim 1, wherein the starting material is tropinone.

References Cited

Manske et al.: The Alkaloids, vol. 1, Academic Press, New York, chapter VI.

ALAN L. ROTMAN, Primary Examiner

U.S. Cl. X.R.

260—294.7; 424—265, 267